United States Patent
Stiernon

(10) Patent No.: US 11,214,702 B2
(45) Date of Patent: Jan. 4, 2022

(54) BLACK COLORING COMPOSITION

(71) Applicant: STIERNON ROBERT ETS, SA, Ghislenghien (BE)

(72) Inventor: Pierre Stiernon, Lasne (BE)

(73) Assignee: STIERNON ROBERT ETS, SA, Ghislenghien (BE)

( * ) Notice: Subject to any disclaimer, the term of this patent is extended or adjusted under 35 U.S.C. 154(b) by 0 days.

(21) Appl. No.: 16/882,469

(22) Filed: May 23, 2020

(65) Prior Publication Data

US 2020/0385598 A1 Dec. 10, 2020

(30) Foreign Application Priority Data

Jun. 7, 2019 (BE) .................................. 2019/5368

(51) Int. Cl.

| | |
|---|---|
| *B27K 5/02* | (2006.01) |
| *C09D 17/00* | (2006.01) |
| *C09D 15/00* | (2006.01) |
| *D21H 17/09* | (2006.01) |
| *D21H 17/67* | (2006.01) |
| *D21H 19/42* | (2006.01) |
| *D21H 21/28* | (2006.01) |

(52) U.S. Cl.
CPC .............. *C09D 17/001* (2013.01); *B27K 5/02* (2013.01); *C09D 15/00* (2013.01); *C09D 17/003* (2013.01); *C09D 17/005* (2013.01); *D21H 17/09* (2013.01); *D21H 17/67* (2013.01); *D21H 19/42* (2013.01); *D21H 21/285* (2013.01); *B27K 2200/10* (2013.01)

(58) Field of Classification Search
CPC ........ B27K 5/02; B27K 2200/10; C09D 7/20; C09D 17/00; C09D 15/00; C09D 17/003; C09D 17/005; D21H 17/67
USPC ............................................................. 8/402
See application file for complete search history.

(56) References Cited

U.S. PATENT DOCUMENTS

| | | | | |
|---|---|---|---|---|
| 5,748,208 | A | * 5/1998 | Uchiyama | .............. B41J 2/2107 347/100 |
| 2006/0229382 | A1 | * 10/2006 | Schweikart | .......... C09D 11/322 523/160 |
| 2007/0131136 | A1 | 6/2007 | Zhang et al. | |
| 2016/0347970 | A1 | 12/2016 | Boest | |

FOREIGN PATENT DOCUMENTS

| | | |
|---|---|---|
| CN | 101735662 A | 6/2010 |
| WO | 2019/036428 A1 | 2/2019 |

OTHER PUBLICATIONS

English translation of the Patent No. CN101735662A (Dec. 2, 2020).*
BE Search Report in Application No. 201905368 dated Feb. 24, 2020.

* cited by examiner

*Primary Examiner* — Eisa B Elhilo
(74) *Attorney, Agent, or Firm* — Maschoff Brennan

(57) ABSTRACT

The present application relates to the field of black coloring of materials made from wood, such as reconstituted wood panels or paper/cardboard. The black coloring composition for wood-based materials includes a black pigment, a reactive type black dye and water. It is also possible to prepare a dry extract for some special applications.

20 Claims, No Drawings

BLACK COLORING COMPOSITION

The present application relates to the field of black coloring of materials made from wood, such as reconstituted wooden panels or paper.

The field of construction, and in particular the interior design of commercial or residential premises, makes extensive use of so-called "reconstituted" wooden panels, such as for example MDF (Medium Density Fiber or panel of fibers of medium density). Increasingly, these panels are offered with various colors. Black panels are more and more used for example to cover the ceilings of commercial areas, possibly arranged so as to dampen noises and the resonance effect.

The coloring of such panels is done industrially during the manufacture of the panel itself. A dye is added when mixing wood particles and a binder, for example a synthetic resin. We obtain a coloring "in the mass" and not simply on the surface of the panel, as a painting would be.

It is particularly difficult to obtain deep black panels. To do this, manufacturers use a coloring mixture combining a pigment (substance that is not soluble in the mixture that it colors) and a dye (soluble in the mixture that it colors). The pigment is generally carbon black, which has the advantage of being inexpensive and of imparting a significant coloring force. The dye is generally nigrosine (Acid Black 2; CI 50420) which designates a family of "acid" type dyes giving a bluish black shade. The sulfonated form of nigrosine, soluble in water, is mainly used.

Since the pigment is insoluble in the aqueous medium in which the dye is dissolved, such a dye composition is a suspension, which has a strong tendency to settle out at rest and must be stirred just before use. This adds a step to the industrial process of coloring wood panels.

This combination gives good results for coloring the wood panels, despite the heterogeneity during the manufacturing process of the panels of the wood base used, which depends in particular on the variety of trees and their age, as well as on the variability composition of binders according to the batches produced.

Nigrosine is made by heating a mixture of nitrobenzene, aniline, and hydrochloric acid in the presence of copper or iron. The synthesis process does not comply with increasing environmental requirements, and a disruption of supply routes is expected in the coming years.

The Applicant has therefore deemed it necessary to propose a new coloring composition not comprising nigrosine but allowing a black rendering of excellent quality of the wood panels incorporating this composition.

SOLUTION OF THE INVENTION

The present invention proposes, for this purpose, a black coloring composition for wood-based materials, comprising:
A black pigment,
A reactive type black dye and
water.

The black pigment is preferably carbon black of the Pigment Black 7 type.

The black pigment preferably represents between 4 and 10% by mass of the coloring composition.

Preferably, the reactive type dye comprises the compound usually called Reactive Black 5 (CAS No: 17095-24-8).

The reactive type dye preferably represents between 10 and 20% by weight of the coloring composition.

The reactive type dye may be a mixture of dyes, and may contain one or more other reactive type dyes, such as the components usually called Reactive Red or Reactive Orange, or any other dye of the same family to vary the shade of black.

The coloring composition according to the invention is preferably devoid of nigrosine and preferably devoid of dye of the acid type. The nigrosine designates here all the chemical forms of the family of dyes covered by the term nigrosine.

However, for certain applications, the coloring composition may be adapted, by adding an additive, to be compatible with nigrosine, that is to say not to chemically react with nigrosine. This may be of interest for industrial chains using compositions according to the invention as well as compositions of the prior art based on nigrosine.

By wood-based materials, it is meant materials whose main constituent is wood, in the form of particles or fibers. It is, for example, agglomerated wood also called fiberboard panel or simply chipboard, which designates any engineered wood manufactured from fibers or particles of wood which have been agglomerated using a binder, under pressure and preferably subjected to a heat treatment, in particular to dry the finished product, that is to say evaporate the solvents which may be present in the binder or in the dye, for example water.

The chipboard is, for example, in the form of a panel of wood particles, a panel of medium density fibers (or MDF), or a panel of large oriented particles (or OSB).

The term wood-based material can also refer to products made from paper pulp, itself made from the cellulose fibers of wood. Such materials are, for example, paper or cardboard.

By black, it is here referred to the visual perception of a human eye. The human eye perceives as black objects reflecting none or very few visible wavelengths. From a purely scientific point of view, black within the meaning of the invention can be extended to other very dark colors close to absolute black, such as brown, navy blue . . . . The invention covers any product could be marketed as "black". In terms of characterization, black within the meaning of the invention may for example designate a color defined in the color space L*a*b*CIE 1976, with a value of brightness L<30%, the terms A* and b* may be non-zero.

The invention therefore also relates to the use of the black coloring composition for coloring in the mass of wood-based materials, such as wood agglomerated optionally in the form of panels, or pulp, paper or cardboard.

For certain applications such as, for example, coloring paper, it is also possible to use a dry extract of the coloring composition, that is to say a black dry coloring extract comprising a black pigment and a black dye of reactive type, as defined above. The proportions between the two components are the same as for the coloring composition according to the invention, once the water has been removed. The dry extract is moreover preferably produced by dry evaporation of the coloring composition. The dry extract according to the invention may contain the same additives, the same dye mixtures as the coloring composition described above.

The dyes are classified according to their chemical structure, mainly on the nature of the chromophore, which constitutes the skeleton necessary for the coloring of the molecule. Associated with the chromophore are ionizable groups called "auxochromes" of amine ($-NH_2$), hydroxide ($-OH$), acid ($-COOH$), sulfonates ($-SO_3H$), halogens ($-Cl$, $-Br$, . . . ) types, etc., making it possible to ensure the solubility in water of the molecule, but also to create a more or less solid bond between the dye and the substrate to be colored. The dyes used in basic or alkaline mediums are called reactive dyes and are rather used in the textile industry for coloring baths, and, in particular, for coloring cotton. Examples of reactive dyes are the dyes of the family "Reactive Black 5" (CAS No. 17095-248) which esters of vinyl sulfone moieties may optionally be substituted by a sulfonate group. These black reactive dyes have a blue shade and are usually called blueish-black or black-blue.

For the coloring of wood-based materials, it is generally accepted in the profession that an "acid" type dye, of which nigrosine is a part, is necessary to obtain a covalent bond with the fibers of the wood and to ensure stable and strong coloring.

The Applicant has therefore been against the general acceptance of the profession by proposing, for coloring wood-based materials, a coloring composition comprising, not an acid type dye, but a reactive type dye.

Reactive type dyes had never been combined with carbon black until then. In preparing the coloring compositions according to the invention, the Applicant has observed that, surprisingly, the carbon black does not settle out and remains in suspension in the coloring mixture, in a homogeneous manner, which also has an indisputable industrial advantage. Indeed, this property makes it possible to eliminate the prior step of stirring the coloring composition used to resuspend carbon black in the compositions based on nigrosine. This allows, in particular, to reduce the production costs of wood-based materials by freeing up space in the facilities of production and saving time and energy in the production chain.

The invention will be better understood using the following description of several implementations of the invention.

Percentages expressed herein are per default percentages by weight, such as usually used in the technical field of the coloring compositions.

a powder or in the form of a dispersion in an aqueous solution, optionally containing additives. Preferably the dispersion comprises at least 40% solid content, more preferably at least 45% solid content. It is supplied in the form of a viscous paste, of viscosity for example between 100 and 800 cps, and having a basic pH, preferably greater than 8. The particles preferably have a particle size less than 1 μm, and preferably between 3 and 500 nm, and more preferably between 100 and 200 nm. Very fine particles are very expensive, too large particles reduce the stability of the product.

The additives which may be present, in particular to guarantee the stability of the pH, may for example be ammonia or derivatives of 2-methyl-2H-isothiazol-3-one. Such dispersions of pigments are for example sold by KEMITEKS under the reference PIGMACOLOR BLACK KBF. These additives are found in the final coloring composition.

The reactive type dye can be a dye or a mixture of reactive dyes comprising "Reactive Black 5" (CAS No 17095-248, tetrasodium 4-amino-5-hydroxy-3,6-bis [[4-(2-sulfonatooxyethylsulfonyl)phenyl]azo]naphthalene-2,7-disulfonate), which vinylsulfone esters may be optionally substituted by a sulfonate group, as illustrated below by compounds I, II, III and IV obtained by copulation of 3-sulphonyl-4-aminophenyl-beta-hydroxy ethylsulphone sulphate ester or "sulfo para base" (CAS No: 42986-22-1) and/or vinyl sulfone ester (CAS No: 2494-89-5; 4-((2-sulfatoethyl)sulfonyl)aniline) on acid H (CAS No. 5460-09-3 or sodium hydrogen 4-amino-5-hydroxynaphthalene-2,7-disulfonate). "Reactive Black 5" has a blue shade and is generally called bluish-black or black-blue.

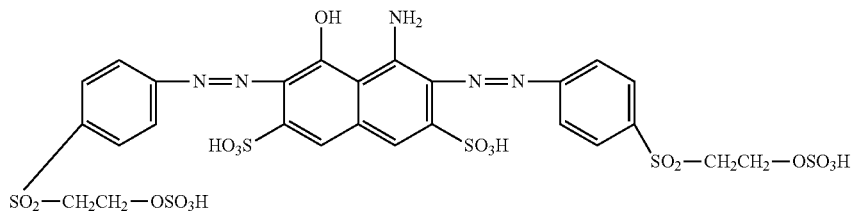

A coloring composition for wood-based materials can be prepared by mixing
a black pigment, I—tetrasodium 4-amino-5-hydroxy-3,6-bis [[4-(2-sulfonatooxyethylsulfonyl)phenyl]azo]naphthalene-2,7-disulfonate

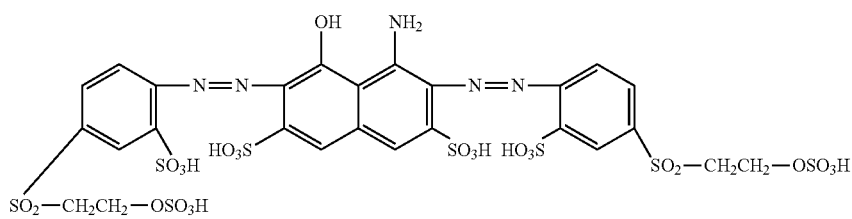

A reactive type dye and
water.
The black pigment can be carbon black of the Pigment Black 7 type (as defined in the Color Index well known to those skilled in the art) which can be supplied in the form of II—TETRASODIUM 4-AMINO-5-HYDROXY-3,6-BIS {{2-SULFO-4{{2-(SULFOOXY) ETHYL}SULFONYL}PHENYL}AZO}NAPHTALENE 2.7 DISULFONATE

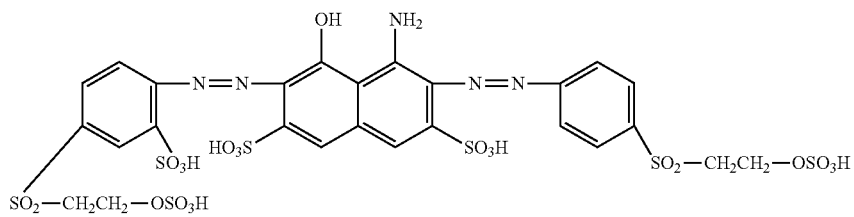

III—TETRASODIUM 4-AMINO-5-HYDROXY-3{{2-SULFO-4-{{2-(SULFOOXY)ETHYL}SULFONYL}PHENYL}AZO}-6{{4-{{2-(SULFONATOOXY)ETHYL}SULFONYL}PHENYL}AZO}NAPHTALENE 2,7 DISULFONATE

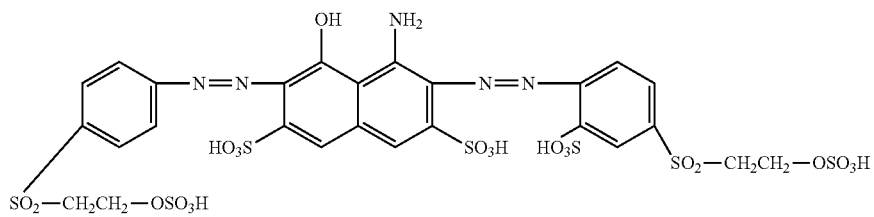

IV—TETRASODIUM 4-AMINO-5-HYDROXY-3{{4{{2-(SULPHONATOOXY)ETHYL}SULFONYL}PHENYL}AZO}6{{2-SULFO-4{{2-(SULFOOXY)ETHYL}SULFONYL}PHENYL}AZO}NAPHTALENE 2.7 DISULFONATE

Carbon black pigment (Pigment black 7) has a black-yellow shade.

One can modulate the type of black obtained by combining to the black pigment one or more black dyes having other shades. For example, in addition to or instead of the "Reactive Black 5" confering a blue-navy blue shade, one can use the "Reactive Red" (CAS No: 607724-47-0; 2-Naphthalenesulfonic acid, 7-amino 4-hydroxy-3,8-bis[[4-[[2-(sulphooxy)ethyl]sulfonyl]phenyl]azo]-, trisodium salt) ato dd a red shade, and/or the "Reactive Orange" (EC No: 937-924-7; 1-3 dihydroxy-2,4bis-(4-(2-sulfooxyethane-sulfonyl)-phenylazo) benzene disodium salt) to give an orange shade, and/or any other suitable dye.

The main dye is a reactive type dye, secondary dyes may possibly be from another family, as long as they are chemically compatible with the reactive dye and wood-based materials.

Preferably, the reactive type dye contains, as the coloring molecule, at least 70% of Reactive Black 5, and may contain up to 30% of other types of reactive dyes.

These dyes are generally supplied in the form of an aqueous solution, having concentrations of coloring molecules of reactive type of between 15 and 50%, preferably between 20 and 45% depending on the solubility of the compounds.

For example, to make a coloring composition according to the invention, for 100 g, one mixes:
  57.25 g of the dye mixture sold by the company Blendwell SA under the name "Blendazol Black NCC liq (deep black)" consisting of:
    25-30% of Reactive Black 5
    3-5% of Reactive Red
    3-5% of Reactive Orange
    60-69% water
  13.00 g of a suspension containing 47% by mass of carbon black in the water and
  29.75 g of water.

A viscous paste is obtained which is an aqueous dispersion having a viscosity of between 100 and 200 cps.

Thus, the composition contains 17.75 to 22.9% by mass of reactive type dye; 6.11% by mass of black pigment and 70.99 to 76.14% water.

This coloring composition is characterized by colorimetric measurement, according to the IEC L*.a*.b*system well known to those skilled in the art.

10 g of the obtained coloring composition are diluted to 1 L in demineralized water maintained with stirring. The sample obtained is then diluted to 1/125 in demineralized water just before being analyzed in transmission mode using a Datacolor spectro-colorimeter, to give a clarity value L*32 64; a*=+2 and b*=−0.70.

More generally, the black pigment preferably represents between 4 and 10% by mass of the coloring composition. The black pigment is relatively inexpensive and gives the composition as well as the finished product an intense and lasting black shade (which does not alter over time).

The reactive type dye preferably represents between 10 and 30% by mass of the coloring composition, and more preferably between 15 and 25% by mass of the coloring composition. This percentage makes it possible, in composition with the pigment, to impart a stable shade to the coloring composition, by binding to the wood fibers permanently (covalent or other).

The percentage of dilution of the composition according to the invention makes it possible to ensure an ideal viscosity, neither too high for handling the composition during its use, nor too diluted in order to limit the volume of composition necessary for the effect obtained, which has an advantage in terms of transport and storage.

Additives can optionally be added, at the request of the user to confer specific properties to the coloring composition, such as for example to adjust the pH, to make it compatible with substances possibly used on the chain of use. Examples of additives are soda, ammonia, sodium carbonate, baking soda, etc.

The Applicant has observed with surprise that the coloring composition obtained is stable, that is to say that it does not decant. A 2.2-ton batch was produced according to the above method. An identical viscosity was measured after two weeks at the surface and at the bottom of the storage container, indicating that there is no difference in concentration of the pigment particles between the top and the bottom of the composition, unlike coloring compositions of the prior art based on nigrosine, for which a significant decantation is observed as early as two or three days after production.

This aspect represents a considerable industrial advantage. Indeed, if the replacement of the nigrosine by a reactive dye has no significant impact on the production costs of the coloring composition, it allows, during use of the coloring composition, to avoid a preliminary step of resuspension, that is to say of homogenization, of the coloring composition. This reduces the production costs of wood-based material.

It is also recalled that the synthesis of reactive dyes does not use reagents or methods presenting an environmental hazard, and as such are preferable to the nigrosine, because they do not display a risk of being prohibited on certain markets or territories. As a result, production continuity can be ensured.

The use of the coloring composition according to the invention will now be described.

The manufacture of wood-based materials, and in particular of agglomerated wood, in the form of plates or panels is generally carried out according to the following stages:
Wood particles are mixed with a binder and, optionally, additives and/or dyes;
The mixture is at least partially dried to obtain a powder;
the powder is deposited in a continuous layer on a conveyor belt;
pressure is applied to the layer to form a plate;
it is heated to harden the mixture, for example above 200° C. for drying the plate at the heart, and
it is cut to the desired dimensions.

The use of the black coloring composition for coloring in the mass of such s wood-based materials, is done in particular by adding the coloring composition to wood particles and to the binder then homogenization of the mixture, before shaping of the material.

For example, to manufacture a wooden plate of the MDF type, it is possible to introduce 5 to 15% by mass of the coloring composition according to the invention, depending on the desired color depth.

A plate of MDF has been colored in the mass with 5 to 15% of the dye composition described above. It was characterized in the CIELAB space by a clarity value $L^*=33$; $a^*=-0.05$; $b^*=0.50$. For comparison, a similar plate colored with a composition based on nigrosine has an $L^*$ value of 33.

The treatment implies that the pigment and the dye of the coloring composition do not degrade with heat. The heat treatment will, moreover, induce the evaporation of the water, at least in part.

Companies manufacturing such wood-based materials receive lots of wood of very different types and quality. Similarly, the binder used is not always the same, its nature and quality may also depend on the source of supply. An important aspect of the coloring composition according to the invention is to ensure the same quality of coloring, whatever the quality of the wood and the binder used to form the wood panel. This is ensured by the combination of the pigment and the reactive type dye which combine their coloring qualities and nuances to ensure a constant rendering with constant coloring composition.

Another example of the use of the coloring composition according to the invention is for coloring paper or cardboard. The preparation of the paper/cardboard pulp is done in large digesters, at high temperature 100 to 175° C. to extract the fibers from the wood, which are then washed and rinsed. A coloring composition according to the invention can then be mixed with the fibers, before they are shaped and dried to obtain paper.

The quantity and shade of the coloring composition according to the invention can be adjusted, within the limits defined above, depending on the quality of the paper/cardboard and the shade required.

The invention claimed is:

1. A process for coloring a mass of a wood based material, comprising:
providing a black coloring composition comprising a black pigment, a reactive type black die and water;
adding the coloring composition to wood particles and to a binder to form a mixture,
homogenizing the mixture, and
shaping the wood-based material.

2. The process according to claim 1, wherein the wood-based material is a chipboard.

3. The process according to claim 1, wherein the wood-based material is pulp, paper or cardboard.

4. A process for coloring a mass of a wood based material, comprising:
providing a black dry coloring extract comprising a black pigment and a reactive type black dye;
adding the black dry coloring extract to wood particles and to a binder to form a mixture,
homogenizing the mixture, and
shaping the wood-based material.

5. The process according to claim 4, wherein the wood-based material is a chipboard.

6. The process according to claim 4, wherein the wood-based material is pulp, paper or cardboard.

7. The process according to claim 4, wherein the black dry coloring extract is obtained by evaporation of a black coloring composition comprising a black pigment, a reactive type black die and water.

8. The process according to claim 7, wherein the wood-based material is a chipboard.

9. The process according to claim 7, wherein the wood-based material is pulp, paper or cardboard.

10. The process according to claim 1, wherein the black pigment represents 4 to 10% by mass of the composition.

11. The process according to claim 1, wherein the reactive type black dye comprises the compound Reactive Black 5.

12. The process according to claim 1, wherein the reactive type black dye represents 10 to 20% by mass of the composition.

13. The process according to claim 1, wherein the black pigment is carbon black.

14. The process according to claim 4, wherein the black pigment is carbon black.

15. The process according to claim 7, wherein the black pigment is carbon black.

16. The process according to claim 5, wherein the black dry coloring extract is obtained by evaporation of a black coloring composition comprising a black pigment, a reactive type black die and water.

17. The process according to claim 6, wherein the black dry coloring extract is obtained by evaporation of a black coloring composition comprising a black pigment, a reactive type black die and water.

18. The process according to claim 10, wherein the wood-based material is a chipboard, pulp, paper or cardboard.

19. The process according to claim 11, wherein the wood-based material is a chipboard, pulp, paper or cardboard.

20. The process according to claim 12, wherein the wood-based material is a chipboard, pulp, paper or cardboard.

* * * * *